US009294569B2

(12) United States Patent
DeCusatis et al.

(10) Patent No.: US 9,294,569 B2
(45) Date of Patent: *Mar. 22, 2016

(54) CELL FABRIC HARDWARE ACCELERATION (71) Applicant: International Business Machines Corporation, Armonk, NY (US)

(72) Inventors: Casimer DeCusatis, Poughkeepsie, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,156

(22) Filed: Sep. 30, 2014

(65) Prior Publication Data

US 2015/0055649 A1 Feb. 26, 2015

Related U.S. Application Data

(63) Continuation of application No. 13/833,880, filed on Mar. 15, 2013, now Pat. No. 9,191,441.

(51) Int. Cl.
*H04L 29/08* (2006.01)
*H04L 12/947* (2013.01)
*H04L 12/54* (2013.01)
(Continued)

(52) U.S. Cl.
CPC .......... *H04L 67/1097* (2013.01); *H04L 49/252* (2013.01); *H04L 49/356* (2013.01); *H04L 12/2602* (2013.01); *H04L 12/5601* (2013.01)

(58) Field of Classification Search
CPC ............ H04L 12/2602; H04L 12/5693; H04L 67/1097; H04L 49/252; H04L 49/356; H04L 12/5601; G06F 13/28
USPC .............. 709/212, 230–231; 370/412; 710/26
See application file for complete search history.

(56) References Cited

U.S. PATENT DOCUMENTS 6,453,366 B1 * 9/2002 Broberg, III ............ G06F 13/28
710/26
6,718,370 B1 * 4/2004 Coffman ............. H04L 12/5693
709/212

(Continued)

OTHER PUBLICATIONS

"Software Defined Networking," IBM Systems and Technology Thought Leadership White Paper, Oct. 2012, Retrieved from the internet: http://public.dhe.ibm.com/common/ssi/ecm/en/qcw03016usen/ on Feb. 6, 2013, 6 pages.

(Continued)

*Primary Examiner* — David Lazaro
*Assistant Examiner* — Zi Ye
(74) *Attorney, Agent, or Firm* — Cantor Colburn LLP; Steven Chiu (57) ABSTRACT

An aspect includes a method for providing direct communication between a server and a network switch in a cell-based fabric. A host channel adapter of a cell fabric hardware accelerator is configured to provide the server with direct access to memory within the network switch. A plurality of data packets having a fixed size is received at the host channel adapter from the server. The host channel adapter is coupled to a bus of the server. A direct transmission is performed from the cell fabric hardware accelerator to the memory within the network switch on an interconnect bus to write the data packets directly into the memory.

14 Claims, 4 Drawing Sheets

(51) Int. Cl.
*H04L 12/931* (2013.01)
*H04L 12/26* (2006.01)

(56) References Cited

U.S. PATENT DOCUMENTS

| | | | | |
|---|---|---|---|---|
| 6,721,806 B2* | 4/2004 | Boyd | ............... | G06F 11/2005 |
| | | | | 714/E11.078 |
| 6,741,602 B1 | 5/2004 | Reohr, Jr. et al. | | |
| 7,299,290 B2 | 11/2007 | Karpoff | | |
| 7,436,845 B1 | 10/2008 | Rygh et al. | | |
| 7,921,686 B2 | 4/2011 | Bagepalli et al. | | |
| 7,958,293 B2 | 6/2011 | Bakke et al. | | |
| 8,089,971 B1 | 1/2012 | Kunz et al. | | |
| 8,165,115 B2* | 4/2012 | Choi | ............... | H04L 49/3009 |
| | | | | 370/389 |
| 2002/0107971 A1* | 8/2002 | Bailey | ............... | H04L 12/2602 |
| | | | | 709/231 |
| 2003/0123469 A1* | 7/2003 | Nong | ............... | H04L 12/5601 |
| | | | | 370/412 |
| 2011/0055510 A1 | 3/2011 | Fritz et al. | | |
| 2011/0106986 A1 | 5/2011 | Wilkinson | | |
| 2011/0125974 A1 | 5/2011 | Anderson | | |
| 2012/0054381 A1 | 3/2012 | Craddock et al. | | |
| 2013/0003751 A1 | 1/2013 | Huse | | |

OTHER PUBLICATIONS

B. Arimilli, et al., "The PERCS High-Performance Interconnect," 2010 IEEE 18th Annual Symposium on High Performance Interconnects (HOTI), pp. 75-82.

International Application No. PCT/IB2014/058896 International Search Report and Written Opinion dated Jun. 13, 2014, 11 pages.

M. Xie, et al., (2011) "Implementation and Evaluation of Network Interface and Message Passing Services for TianHe-1A Supercomputer," 2011 IEEE 19th Annual Symposium on High Performance Interconnects (HOTI), pp. 78-86.

N. McKeown, et al., "OpenFlow: Enabling Innovation in Campus Networks," Mar. 14, 2008, Retrived from the internet: http://www.openflow.org on Jan. 29, 2013, 6 pages.

OpenFlow Switch Specification, Version 1.1.0 Implemented (Wire Protocol 0x02), Feb. 28, 2011, Retrieved from the internet: http://www.openflow.org on Jan. 29, 2013, 56 pages.

* cited by examiner

FIG. 4 ional priority to U.S. application Ser.

CELL FABRIC HARDWARE ACCELERATION

DOMESTIC PRIORITY

This application is a continuation of U.S. application Ser. No. 13/833,880 filed Mar. 15, 2013, the disclosure of which is incorporated by reference herein in its entirety.

BACKGROUND

The present invention relates to computer networks and, more specifically, to cell fabric hardware acceleration in a computer network.

Ethernet networks are typically employed in local area networks (LANs) that include a plurality of network switches. A number of communication protocols have been developed and continue to evolve to enhance Ethernet network performance for various environments. For example, an enhancement to Ethernet, called data center bridging (DCB), converged enhanced Ethernet (CEE) or data center Ethernet (DCE), supports the convergence of LANs with storage area networks (SANs). Other protocols that can be used in a data center environment in conjunction with Ethernet include, for instance, Fibre Channel over Ethernet (FCoE), Internet Wide Area Remote direct memory access Protocol (iWARP), Remote direct memory access over Converged Ethernet (RoCE).

Computer networks can be organized as cell fabrics as one alternative to Ethernet. A cell fabric typically uses fixed frame sizes, while Ethernet uses variable sized packets and frames. Formatting differences between network types can result in difficulty establishing efficient communication between a cell fabric and an Ethernet network. Typically, communication between a cell fabric and Ethernet requires higher-level protocol translation which can involve substantial overhead and increased latency.

SUMMARY

According to an aspect, a method for direct communication between a server and a network switch in a cell-based fabric is provided. A host channel adapter of a cell fabric hardware accelerator is configured to provide the server with direct access to memory within the network switch. A plurality of data packets having a fixed size is received at the host channel adapter from the server. The host channel adapter is coupled to a bus of the server. A direct transmission is performed from the cell fabric hardware accelerator to the memory within the network switch on an interconnect bus to write the data packets directly into the memory.

According to a further aspect, a computer program product for direct communication between a server and a network switch in a cell-based fabric is provided. The computer program product includes a tangible storage medium readable by a processing circuit and storing instructions for execution by the processing circuit for performing a method. The method includes configuring a host channel adapter of a cell fabric hardware accelerator to provide the server with direct access to memory within the network switch. A plurality of data packets having a fixed size is received at the host channel adapter from the server. The host channel adapter is coupled to a bus of the server. A direct transmission is performed from the cell fabric hardware accelerator to the memory within the network switch on an interconnect bus to write the data packets directly into the memory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to cell fabric hardware acceleration in a computer network. A hardware accelerator is provided for direct communication between one or more servers and switches in a cell-based fabric supporting fixed frame or packet sizes. The switches may also support variable packet size protocols such as one or more Ethernet-based protocols. Rather than provide complex high-level protocol translation logic to support communication format translation between a cell-based fabric and an Ethernet network, exemplary embodiments use low-level memory transfers to directly load memory within the switch from a host channel adapter of the cell fabric. A cell fabric hardware accelerator provides a high-bandwidth interface between host processors in a cell fabric and memory within network switches.

Figure 1:
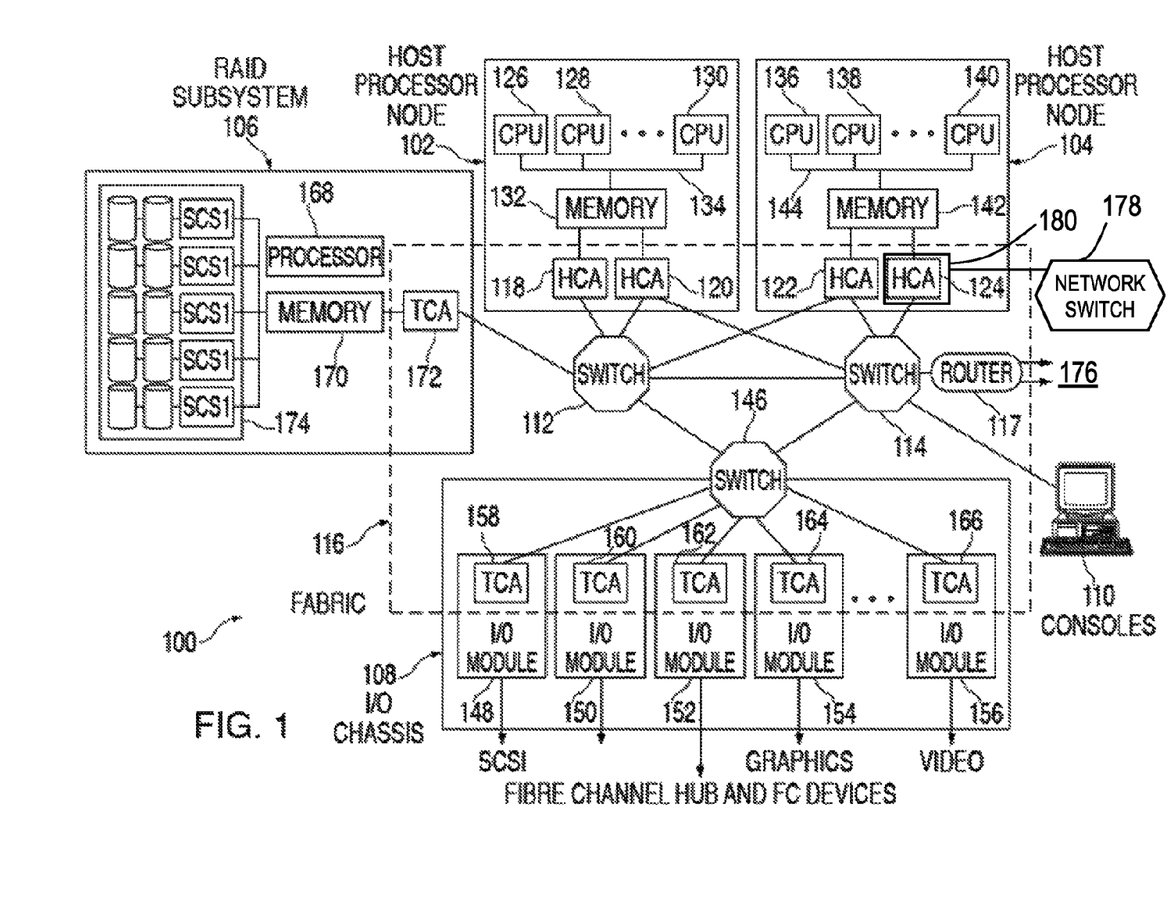
FIG. 1 depicts a block diagram of a storage area network with cell fabric hardware acceleration according to an embodiment.

Exemplary embodiments may be implemented in a distributed computing system that includes a cell-based fabric, such as a storage area network (SAN) having end nodes, switches, routers, and links interconnecting these components. FIG. 1 is a diagram of a distributed computer system where exemplary embodiments may be implemented. The distributed computer system represented in FIG. 1 takes the form of a SAN 100 and is provided merely for illustrative purposes. Exemplary embodiments as described herein can be implemented on computer systems of numerous other types and configurations. For example, computer systems of exemplary embodiments can range from a small server with one processor and a few input/output (I/O) adapters to massively parallel supercomputer systems with hundreds or thousands of processors and thousands of I/O adapters.

Referring to FIG. 1, the SAN 100 is a high-bandwidth, low-latency network for interconnecting nodes within a distributed computer system. A node is any component attached to one or more links of a network and forming the origin and/or destination of messages within the network. In the example depicted in FIG. 1, the SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can interconnect any number and any type of independent processor nodes, I/O adapter nodes, and I/O device nodes. Any one of the nodes can function as an end node, which is herein defined to be a device that originates or finally consumes messages or frames in SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN 100. The trailer generally contains control and cyclic redundancy check (CRC) data to verify that packets are not delivered with corrupted contents.

The SAN 100 contains communications and management infrastructure supporting both I/O and interprocessor communications (IPC) within a distributed computer system. The SAN 100 includes a switched communications fabric 116, which allows many devices to concurrently transfer data with high-bandwidth and low-latency in a secure, remotely managed environment. In exemplary embodiments, the fabric 116 is a cell-based fabric that employs fixed size frames or packets. End nodes can communicate over multiple ports and utilize multiple paths through the fabric 116. Multiple ports and paths through the SAN 100 can be employed for fault tolerance and increased bandwidth data transfers.

In the example of FIG. 1, the SAN 100 is depicted as including three switches 112, 114, and 146, and router 117. A switch is a device that connects multiple links together and allows routing of packets from one link to another link within a subnet using a small header destination local identifier (DLID) field. A router is a device that connects multiple subnets together and is capable of routing frames from one link in a first subnet to another link in a second subnet using a large header destination globally unique identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgement packets. Switches and routers pass packets along, from the source to the destination. Except for the variant CRC trailer field, which is updated at each stage in the network, switches typically pass the packets along unmodified. Routers may update the variant CRC trailer field and modify other fields in the header as the packet is routed.

In the SAN 100, the host processor node 102, host processor node 104, and I/O chassis 108 include at least one remote direct memory access (RDMA) capable channel adapter (CA) to interface to SAN 100. In exemplary embodiments, each CA is an endpoint that implements the CA interface in sufficient detail to source or sink packets transmitted on SAN fabric 116. Host processor node 102 contains CAs in the form of RDMA capable host channel adapters (HCAs) 118 and 120. Host processor node 104 contains HCAs 122 and 124. Host processor node 102 also includes central processing units (CPUs) 126-130 and a memory 132 interconnected by bus system 134. Host processor node 104 similarly includes CPUs 136-140 and a memory 142 interconnected by a bus system 144. HCAs 118 and 120 provide a connection from host processor node 102 to switch 112; while HCAs 122 and 124 provide a connection from host processor node 104 to switches 112 and 114.

In exemplary embodiments, an HCA is implemented in hardware. In this implementation, the HCA hardware offloads much of the central processing unit I/O adapter communication overhead. This hardware implementation of the HCA also permits multiple concurrent communications over a switched network without the traditional overhead associated with communication protocols. In one embodiment, the HCAs and SAN 100 provide the I/O and IPC consumers of the distributed computer system with zero processor-copy data transfers without involving an operating system kernel process, and employs hardware to provide reliable, fault tolerant communications.

The router 117 may be coupled to wide area network (WAN) and/or local area network (LAN) connections 176 to other hosts or other routers. The router 117 can be a separate device or integrated with one or more of the switches 112, 114, 146. I/O chassis 108 includes an I/O switch 146 and multiple I/O modules 148-156. In this example, the I/O modules 148-156 take the form of adapter cards. Example adapter cards include a SCSI adapter card for I/O module 148; fibre channel hub and fibre channel arbitrated loop (FC-AL) device adapter cards for I/O modules 150 and 152; a graphics adapter card for I/O module 154; and a video adapter card for I/O module 156. Any known type of adapter card can be implemented. I/O adapters also include a switch in the I/O adapter to couple the adapter cards to the fabric 116. These modules contain RDMA capable target channel adapters (TCAs) 158, 160, 162, 164, and 166.

In the example depicted in FIG. 1, the RAID subsystem node 106 includes a processor 168, a memory 170, a TCA 172, and multiple redundant and/or striped storage disk units 174. TCA 172 can be a fully functional HCA.

The SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as HCAs, which enable efficient message passing protocols. SAN 100 is suited to current computing models and is a building block for new forms of I/O and computer cluster communication. Further, the SAN 100 allows I/O adapter nodes to communicate with each other or to communicate with any of the processor nodes in distributed computer systems. With an I/O adapter attached to the SAN 100 the resulting I/O adapter node has substantially the same communication capability as any host processor node in SAN 100.

In exemplary embodiments, the SAN 100 shown supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process.

In memory semantics, the destination process previously grants permission for the source process to access its memory.

Channel semantics and memory semantics are typically both utilized for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem TCA 172. The disk I/O adapter examines the command and uses memory semantics to read the data buffer directly from the memory space of the host processor node. After the data buffer is read, the disk I/O adapter employs channel semantics to push an I/O completion message back to the host processor node.

In exemplary embodiments, to reduce protocol and processing overhead in communicating with a network switch, such as network switch 178 of FIG. 1, which may be part of an Ethernet network, a cell fabric hardware accelerator 180 is provided. In the example of FIG. 1, the cell fabric hardware accelerator 180 provides an interface from HCA 124 such that memory within the network switch 178 can be treated as cache memory of the host processor node 104. Rather than routing network traffic for the network switch 178 through switches 114 and 146 of the fabric 116 and through an associated adapter at the I/O chassis 108 with a TCA and I/O module for protocol conversion, exemplary embodiments establish a high-bandwidth interconnect between the HCA 124 and the network switch 178 via the cell fabric hardware accelerator 180.

Figure 2:
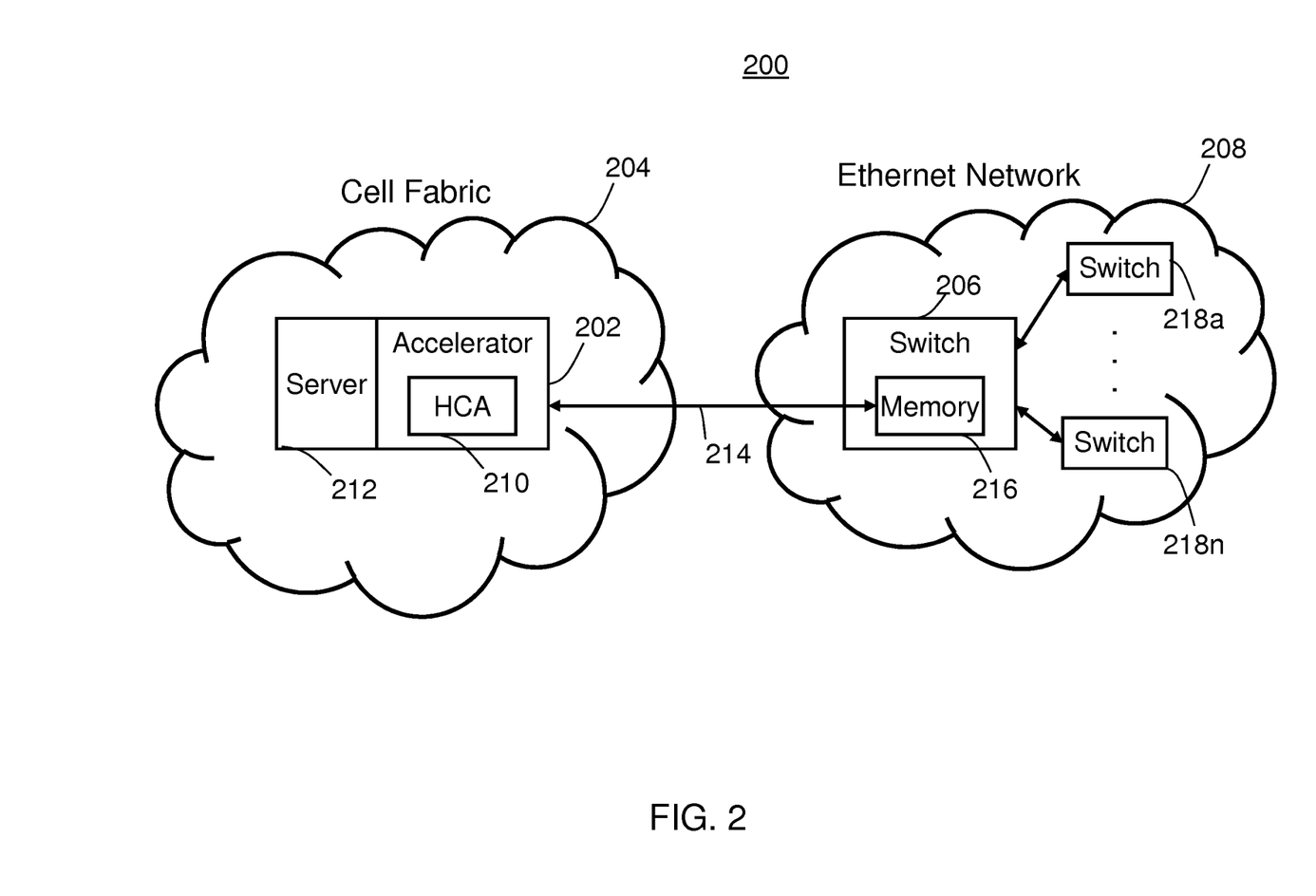
FIG. 2 depicts an example of a computer network with cell fabric hardware acceleration interfacing with a switch in an Ethernet network according to an embodiment.

FIG. 2 depicts an example of a computer network 200 with a cell fabric hardware accelerator 202 in a cell fabric 204 interfacing with a network switch 206 in an Ethernet network 208 according to an embodiment. The cell fabric hardware accelerator 202 is an embodiment of the cell fabric hardware accelerator 180 of FIG. 1. The cell fabric 204 is an embodiment of the fabric 116 of FIG. 1, and the network switch 206 is an embodiment of the network switch 178 of FIG. 1. The cell fabric hardware accelerator 202 includes an HCA 210 that is an embodiment the HCA 124 of FIG. 1. The cell fabric hardware accelerator 202 interfaces to a server 212 that may include the memory 142 and one or more of the CPUs 136-140 of the host processor node 104 of FIG. 1. An interconnect bus 214 provides a high bandwidth interface between the cell fabric hardware accelerator 202 and memory 216 in the network switch 206.

The network switch 206 is networked to a number of other network switches 218a-218n within the Ethernet network 208. While described as an Ethernet network 208, the network switches 206 and 218a-218n may be configured to support a number of communication protocols and are not limited strictly to Ethernet implementations. For example, the Ethernet network 208 may be any network that supports variable packet sizes, while the cell fabric 204 is any fabric that supports fixed packet or frame sizes. In one embodiment, the Ethernet network 208 is implemented using a lossless Ethernet protocol.

Figure 3:
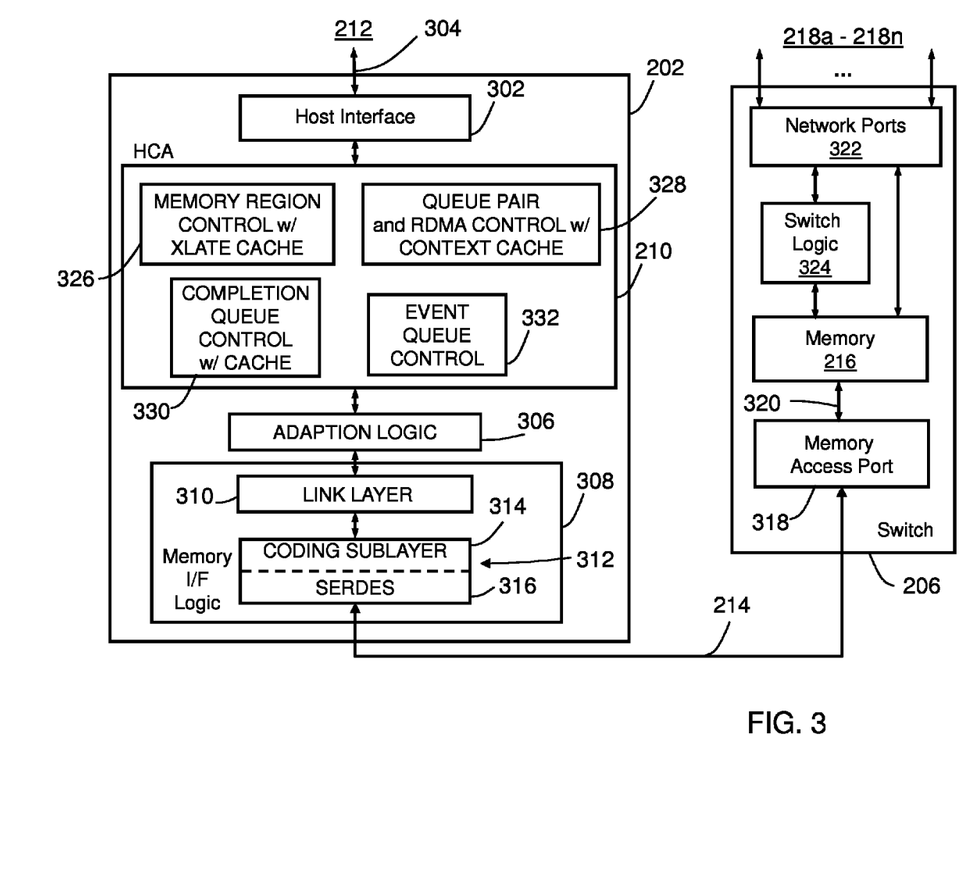
FIG. 3 depicts a block diagram of a cell fabric hardware accelerator interfacing with memory of a network switch according to an embodiment.

FIG. 3 depicts a block diagram that includes further details of the cell fabric hardware accelerator 202 interfacing with the memory 216 of the network switch 206 of FIG. 2 according to an embodiment. The cell fabric hardware accelerator 202 includes a host interface 302 configured to communicate with the server 212 via a bus 304. The bus 304 may be an optical bus that is part of bus system 144 of FIG. 1. In one embodiment, the bus 304 includes multiple high-speed serial links, such as peripheral component interconnect express (PCIe) compatible links. When implemented as serial links, the host interface 302 can include a serializer/deserializer (SerDes) function, a coding sub-layer, a link layer, and a transaction layer for low-level translation between the interface format of the bus 304 and the HCA 210. Alternatively, the bus 304 can be a parallel bus, and the host interface 302 provides a parallel interface between the bus 304 and the HCA 210.

The HCA 210 in the cell fabric hardware accelerator 202 may also include adaption logic 306 and memory interface logic 308. The adaption logic 306 is a connection interface between the HCA 210 and the memory interface logic 308. The adaption logic 306 may be included where the HCA 210 and the memory interface logic 308 cannot otherwise be directly connected due to interfaces differences. The memory interface logic 308 may include a link layer chip 310 and a physical interface 312 that includes a coding sub-layer 314 and a serializer/deserializer (SerDes) 316. The link layer chip 310 may support a low-level protocol for encapsulating packets into frames, providing synchronization, error detection, physical addressing, and flow control. The coding sub-layer 314 and the SerDes 316 of the physical interface 312 provide low-level bit, symbol, or line coding for communication on the interconnect bus 214. In one embodiment, the interconnect bus 214 include a plurality of high-speed (e.g., 10 gigabits/second) serial links. The SerDes 316 can be omitted for embodiments where the interconnect bus 214 is a parallel bus.

The interconnect bus 214 may be a memory bus or may connect through a memory access port 318 of the switch 206 to a memory bus 320 coupled to the memory 216 in the switch 206. The memory access port 318 may provide line buffering and/or signal level, timing, and format adjustments, e.g., optical/electrical conversion, between the interconnect bus 214 and the memory bus 320. In an exemplary embodiment, the memory 216 is a memory queue for sending packets on network ports 322 to the other network switches 218a-218n within the Ethernet network 208 of FIG. 2 as controlled by switch logic 324. In an alternate embodiment, the interconnect bus 214 is coupled to one of the network ports 322 to access the memory 216.

The switch 206 may be an OpenFlow-capable switch or a non-OpenFlow-capable switch. OpenFlow is a type of software-defined networking that allows an external controller to control how data packets are forwarded through a network. Accordingly, the memory 216 may include an OpenFlow flow table that defines data flows and actions for the switch 206.

The HCA 210 includes a number of controls for writing to the memory 216 of the switch 206. In an embodiment, the HCA 210 handles the memory 216 within the switch 206 as a cache memory of the server 212 of FIG. 2. The HCA 210 includes a memory region control with translation cache 326, a queue pair and RDMA control with context cache 328, a completion queue control with cache 330, and an event queue control 332. The memory region control with translation cache 326 registers the memory 216 of the switch 206 to inform the server 212 of FIG. 2 that the memory 216 can be used for RDMA operations. Address translations can also be handled by the memory region control with translation cache 326. The queue pair and RDMA control with context cache 328 supports send and receive queues for scheduling work operations to access the memory 216. Work requests can be sent from the server 212 of FIG. 2 to the queue pair and RDMA control with context cache 328 as work queue elements to move data to or from the memory 216. RDMA controls movement of data between the HCA 210 and the memory 216. The HCA 210 creates completion queue elements on the completion queue control with cache 330 when a work queue element transaction completes to notify the sever 212 of FIG. 2 of transaction completion. The event queue control 332 may be associated with events on the link layer chip 310 such as completion events or errors.

Figure 4:
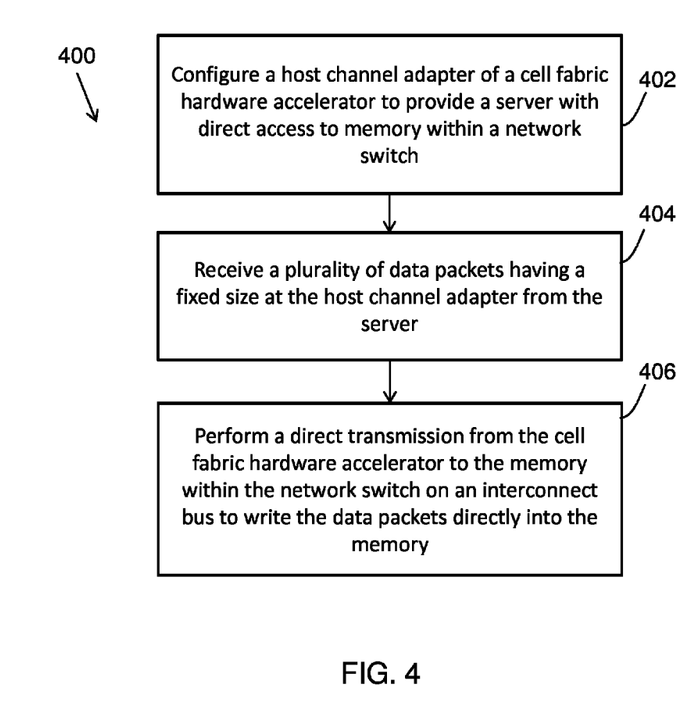
FIG. 4 depicts a flow diagram of a process for cell fabric hardware acceleration in a computer network according to embodiments.

Turning now to FIG. 4, a flow diagram of a process 400 for cell fabric hardware acceleration will be described in an exemplary embodiment. The process 400 is described in reference to FIGS. 1-3 and can be implemented by the SAN 100 of FIG. 1 and/or the computer network 200 of FIGS. 2 and 3.

At block 402, HCA 210 of the cell fabric hardware accelerator 202 is configured to provide the server 212 with direct access to memory 216 within the network switch 206. The memory 216 within the network switch 206 is configured as a cache memory of the server 212. The memory region control with translation cache 326 in the HCA 210 registers the memory 216 to inform the server 212 that the memory 216 is accessible using remote direct memory access operations.

At block 404, a plurality of data packets having a fixed size is received at the HCA 210 from the server 212. The HCA 210 is coupled to a bus 304 of the server 212. Work operations at the HCA 210 are scheduled for the memory 216 within the network switch 206 using a queue pair of the queue pair and RDMA control with context cache 328 in the HCA 210 based on work requests received from the server 212.

At block 406, a direct transmission from the cell fabric hardware accelerator 202 to the memory 216 within the network switch 206 is performed on an interconnect bus 214 to write the data packets directly into the memory 216. Adaption logic 306 is interfaced between the HCA 210 and memory interface logic 308, where the memory interface logic 308 includes a link layer chip 310 and a physical interface 312 coupled to the interconnect bus 214. The event queue control 332 of the HCA 210 tracks events associated with the link layer chip 310. A completion queue control of the completion queue control with cache 330 can provide the server 212 with one or more transaction completion notifications for the scheduled work operations at the HCA 210.

Technical effects include a hardware accelerator for direct communication between servers and switches in a cell-based fabric. Using remote direct memory access to load memory within a switch can reduce delays associated with protocol translation and/or indirect paths to the switch. Performing memory loads in a switch using low-level protocol transactions can reduce issues of compatibility between higher-level protocols, particularly when interfacing fixed size frame or packet communication formats to variable size packet formats.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A method for providing direct communication between a server and a network switch in a cell-based fabric, the method comprising:
   configuring a host channel adapter of a cell fabric hardware accelerator to provide the server with direct access to memory within the network switch;
   receiving a plurality of data packets having a fixed size at the host channel adapter from the server, the host channel adapter coupled to a bus of the server; and
   performing a direct transmission from the cell fabric hardware accelerator to the memory within the network switch on an interconnect bus to write the data packets directly into the memory via a memory access port of the network switch using a remote direct memory access (RDMA) operation, the memory access port providing line buffering and format adjustment between the interconnect bus and the memory, and the memory access port is independent of network ports of the network switch that send packets to a plurality of other network switches using variable packet sizes.

2. The method of claim 1, further comprising:
   configuring the memory within the network switch as a cache memory of the server.

3. The method of claim 1, wherein configuring the host channel adapter of the cell fabric hardware accelerator to provide direct access to memory within the network switch further comprises registering the memory to inform the server that the memory is accessible using remote direct memory access operations.

4. The method of claim 1, further comprising:
   interfacing adaption logic between the host channel adapter and memory interface logic, the memory interface logic comprising a link layer chip and a physical interface coupled to the interconnect bus.

5. The method of claim 4, further comprising:
   tracking events associated with the link layer chip using an event queue control of the host channel adapter.

6. The method of claim 1, further comprising:
   scheduling work operations at the host channel adapter for the memory within the network switch using a queue pair in the host channel adapter based on work requests from the server.

7. The method of claim 6, further comprising:
   providing the server with one or more transaction completion notifications for the scheduled work operations at the host channel adapter using a completion queue control.

8. The method of claim 1, wherein the network switch is part of an Ethernet network comprising the other network switches.

9. A computer program product for providing direct communication between a server and a network switch in a cell-based fabric, the computer program product comprising:
   a non-transitory storage medium readable by a processing circuit and storing instructions for execution by the processing circuit for performing a method comprising:
      configuring a host channel adapter of a cell fabric hardware accelerator to provide the server with direct access to memory within the network switch;

receiving a plurality of data packets having a fixed size at the host channel adapter from the server, the host channel adapter coupled to a bus of the server; and performing a direct transmission from the cell fabric hardware accelerator to the memory within the network switch on an interconnect bus to write the data packets directly into the memory via a memory access port of the network switch using a remote direct memory access (RDMA) operation, the memory access port providing line buffering and format adjustment between the interconnect bus and the memory, and the memory access port is independent of network ports of the network switch that send packets to a plurality of other network switches using variable packet sizes.

10. The computer program product of claim 9, further comprising:

configuring the memory within the network switch as a cache memory of the server.

11. The computer program product of claim 9, wherein configuring the host channel adapter of the cell fabric hardware accelerator to provide direct access to memory within the network switch further comprises registering the memory to inform the server that the memory is accessible using remote direct memory access operations.

12. The computer program product of claim 9, further comprising tracking events associated with a link layer chip using an event queue control of the host channel adapter.

13. The computer program product of claim 9, further comprising:

scheduling work operations at the host channel adapter for the memory within the network switch using a queue pair in the host channel adapter based on work requests from the server.

14. The computer program product of claim 13, further comprising:

providing the server with one or more transaction completion notifications for the scheduled work operations at the host channel adapter using a completion queue control.

* * * * *